United States Patent [19]

Cotter et al.

[11] 3,917,469

[45] Nov. 4, 1975

[54] METHOD FOR THE REMOVAL OF SULFUR DIOXIDE FROM GAS MIXTURES

[75] Inventors: Robert J. Cotter, Bernardsville; Michael J. Keogh, Somerville, both of N.J.

[73] Assignee: Union Carbide Corporation, New York, N.Y.

[22] Filed: July 24, 1974

[21] Appl. No.: 491,601

[52] U.S. Cl. .................. 55/73; 55/74; 260/88.1 PN
[51] Int. Cl.² ........................................ B01D 53/02
[58] Field of Search ............ 55/73, 74; 260/88.1 PN

[56] References Cited
UNITED STATES PATENTS

| | | | |
|---|---|---|---|
| 3,564,818 | 2/1971 | Lasky et al. | 55/74 X |
| 3,646,594 | 2/1972 | Lasky et al. | 55/74 X |

Primary Examiner—John Adee
Assistant Examiner—Ethel R. Gross
Attorney, Agent, or Firm—B. F. Crowe

[57] ABSTRACT

Sulfur dioxide can be removed from gas mixtures by adsorption on polymers containing pendant nitrogen containing moieties.

16 Claims, No Drawings

METHOD FOR THE REMOVAL OF SULFUR DIOXIDE FROM GAS MIXTURES

BACKGROUND OF THE INVENTION

This invention pertains to the adsorption of $SO_2$ from gas mixtures and in particular to the use of normally solid organic polymers containing pendant nitrogen containing moieties.

Power plant gas effluents as well as other industrial waste gases contribute to the general environmental air pollution problems extant. One of the six chief air pollutants, $SO_2$, is a common component of these waste gases. In the past many methods have been used in attempts to reduce $SO_2$ air pollution, but none are being practiced widely in attempts to consistently meet the National Air Quality Standards which call for a maximum of 0.14 parts per million (ppm) of $SO_2$ for a 24 hour period. Alkaline water scrubbing, ammonia scrubbing, and limestone scrubbing are examples of limited solutions to this problem. It is an object of this invention to provide a method of $SO_2$ adsorption from gas mixtures which is selective for $SO_2$. For example, $CO_2$ is present in stack gases in much larger quantities than $SO_2$ and its adsorption is undesirable.

Another object of this invention is to provide an adsorbent for $SO_2$ which is chemically stable, water-insoluble and which is readily regenerated.

SUMMARY OF THE INVENTION

The above objects have been satisfied by a method which comprises contacting gas mixtures containing sulfur dioxide and moisture at a temperature of about 0° to about 90°C. with a normally solid polymer having repeating groups represented by the formula:

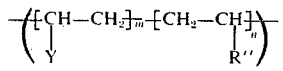

wherein Y is a monovalent radical selected from the group consisting of:

—N(R)$_2$
—N(R'OH)$_2$
—NHR'OH

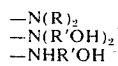—N(R'OH)$_2$

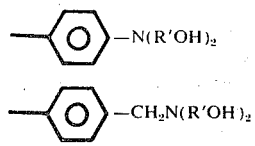—CH$_2$N(R'OH)$_2$ wherein R is alkyl containing 1 to 18 carbon atoms, R' is an alkylene group containing 1 to about 6 carbon atoms, R'' is a monovalent radical selected from the group consisting of: hydrogen, lower alkyl groups having up to about 4 carbon atoms, halogen or phenyl, $m$ is an integer having a value of about 50 to about 500 and $n$ is an integer having a value of 0 to about 500.

Preferred normally solid polymers include homopolymers containing the following repeating units:

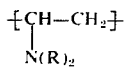

where R is methyl, ethyl, n-propyl, isopropyl or n-butyl;

—(CH—CH$_2$)—
   |
   HNR'OH where R' is methylene, ethylene, propylene, or butylene;

—(CH—CH$_2$)—
   |
   N(R'OH)$_2$ where R' is methylene, ethylene, propylene, or butylene;

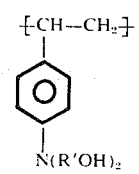

where R' is methylene, ethylene, propylene, or butylene; and

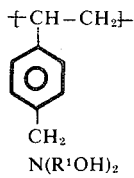

where R' is methylene, ethylene, propylene, or butylene;

Preferred copolymers are those containing the repeating units delineated immediately above in combination with a random distribution of the following repeating units:

[—CH$_2$—CH$_2$—]
[—CH$_2$—CHCH$_3$—]

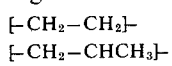 and

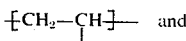
      halogen where the order of preference of halogen is Cl, Br and F.

The normally solid polymers described above can be used in their original, linear, soluble form or they can be converted to crosslinked polymers with crosslinking monomers such as divinyl benzene, divinyltoluenes, divinylnaphthalenes, divinylxylene, divinylethylbenzene, trivinylbenzene, trivinylnaphthalene, polyvinylanthracenes, glycol dimethacrylate and other crosslinking monomers well known in the art and used in the synthesis of ion-exchange resins. Alternatively one can polymerize a monomer having the formula HCY=CH$_2$, where Y is as defined above, alone or in combination with a monomer having the formula CH$_2$=CHR'', where R'' is as defined above, in the presence of a crosslinking agent described above.

A still further alternative is to prepare a crosslinked polymer by polymerizing a monomer such as CH$_2$=CHCl or 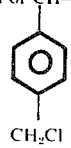

with a crosslinking agent followed by treatment of the resultant crosslinked polymer with a reactant such as an alkylamine, or an alkanolamine which affords pendant nitrogen containing groups.

Yet another route to these useful $SO_2$ adsorbing polymers is the polymerization of styrene in the presence of a crosslinking agent followed by chloromethylation to afford an intermediate which can be further treated with an alkyl amine or alkanolamine as in the preceding paragraph.

Although some $SO_2$ can be removed from dry gas mixtures with the above-described polymers, it is preferred for efficient $SO_2$ removal that the gas mixture contain at least 0.1% by weight of water vapor. For optimum $SO_2$ removal efficiency, it is preferred that the gas mixture contain from about 0.7 to about 1.5% by weight of water vapor.

These adsorbent polymers may be used in particulate form or deposited on a support, preferably one having a high surface area. In the case of supported polymers the particular support can be immersed in a solution of the adsorbent polymer and then the solvent removed leaving linear polymer behind. For the formation of crosslinked polymers a small amount, i.e., 1–25% by weight of a crosslinking monomer can be added to the solution of the linear polymer. After removal of the solvent a short heating period preferably in the presence of a free-radical polymerization initiator such as dibenzoyl peroxide, dilauroyl peroxide, azobisisobutyronitrile, diisopropyl peroxydicarbonate or the like, results in the production of crosslinked polymer on the support. It will be understood that beads of unsupported crosslinked polymers can also be made in the same way by merely eliminating the support.

The identity of the support is not critical since it is not involved directly with the adsorption process. Examples of acceptable supports include but are not limited to polyurethane foams, industrial filter paper, glass fiber matting, plastic mesh screens, porous siliceous materials such as clays and silica gels, macroreticular polystyrene beads, and the like.

The polymeric adsorbents of this invention preferentially absorb $SO_2$ over $CO_2$ which is of commercial significance since the adsorption of the omnipresent $CO_2$ lowers the efficiency of any $SO_2$ removal system.

These adsorbents may be regenerated by raising the temperature to above 90° to 150°C. in which range the reverse phenomenon, desorption, takes place. The desorbed $SO_2$ may be converted to liquid $SO_2$, sulfur or other useful products.

Regeneration can also be carried out by contacting the polymeric adsorbent with a base such as an alkali metal hydroxide, alkaline earth hydroxide, or an alkali metal alkoxide having 1 to about 4 carbon atoms, and the like.

The evaluation of various $SO_2$ adsorbents was conducted with apparatus constructed specifically for that purpose. The system used was composed of a gas metering device and an $SO_2$ monitor. In operation, the monitor was first calibrated with a gas containing a standardized concentration of $SO_2$. Once this calibration had been completed, the adsorbents were tested by inserting a test specimen in the gas line before the monitor and observing the registered change in the $SO_2$ concentration of the effluent gas stream.

The calibration gases were either drawn from a cylinder or generated by $SO_2$ permeation tubes prepared by the National Bureau of Standards to emit a constant weight of $SO_2$ at a specified temperature. The cylinders of gas were used when high $SO_2$ concentrations were required whereas permeation tubes were used for low $SO_2$ concentrations i.e., in the range of 0.5 to 5.0 ppm (parts per million).

Authentic, ambient air can be used to evaluate these adsorbents for their effectiveness in removing the $SO_2$ therein, i.e., in the range of 0.01–0.2 ppm. $SO_2$ concentrations can be measured with a Dynasciences Monitor and a continuous, colorimetric method based on the West-Gaeke method for $SO_2$ analysis.

For commercial scale $SO_2$ removal operations, a variety of fabricated filter elements, such as honeycombs, corrugations, cylinders, meshes, fibrous panels, etc. can be employed. These can be tailor-made to be fitted in pipes, conduits, chimmey-stacks and the like. They can be designed for use in a static, or fixed mode, or in a dynamic, moving bed mode of operation.

The invention is further described in the examples which follow.

All parts and percentages are by weight unless otherwise specified.

EXAMPLE 1

Preparation of Vinylbenzyl Diethanolamine and Copolymerization with Styrene

Vinylbenzyl chloride (76.0 g.; 0.5 mole) and 105.0 g. (1.15 moles) of diethanolamine were mixed in a 500 cc. round bottom flask fitted with a condenser and equipped to stir magnetically. This mixture was heated as a homogeneous solution and maintained at 120°C. for 6 hours while stirring magnetically before letting it cool down to room temperature. Dilute hydrochloric acid (10% by weight in water) was added dropwise until the pH was on the acid side, at which time the solution was transferred to a separatory funnel and the residual vinylbenzyl chloride was extracted with 1 liter of diethyl ether. The pH of the aqueous layer was adjusted to 10 by the addition of a 10% aqueous solution of sodium hydroxide before extraction with four 500 ml. portions of diethyl ether. These extracts were combined and dried over anhydrous magnesium sulfate. After filtration the solvent was stripped under vacuum leaving a brown, oily residue weighing 108.8 g. This amounts to a yield of 45.7% calculated as vinylbenzyl diethanolamine. The amine equivalent weight of this product was 218 (theoretical 221) and its infrared spectrum was consistent with the structure of vinylbenzyl diethanolamine.

The preparation of the linear copolymer of vinylbenzyl diethanolamine and styrene was carried out as follows:

A mixture of 7.2 grams of vinylbenzene diethanolamine, 26 grams of styrene and 30 ml. of benzene was subjected to heating at 60°C. in the presence of a catalytic amount of azobisisobutyronitrile until polymerization took place. A yield of 19.2 grams of a normally solid polymer having repeating units represented by the following formula

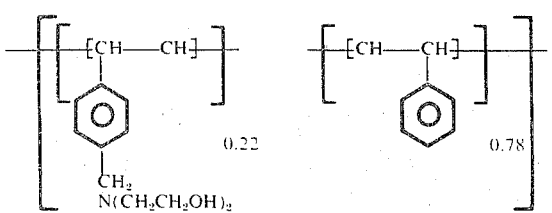

was obtained. The reduced viscosity of this product was 0.202 (0.2 grams in 100 ml. of chloroform at 25°C.). The ratio of repeating units was determined by analysis for N in the resultant polymer.

The polymer as prepared above was packed into a Teflon tube 1 × ¼ inch I.D. and inserted into an apparatus consisting of a gas metering device and an $SO_2$ monitor. In operation the monitor was first calibrated with a gas containing a standardized concentration of $SO_2$. Once this calibration had been completed, the adsorbents were tested by inserting the test specimen tube in the gas line before the monitor and observing the registered change in the $SO_2$ concentration of the effluent gas stream. A Dynasciences Monitor was used to measure $SO_2$ concentration.

It was found that using a gas stream containing 1.2 ppm of $SO_2$ and a flow rate of 200 cc/min. at 30°C. that 90% of the $SO_2$ was adsorbed from the gas stream for about 15 minutes. After 8 hours the amount of $SO_2$ adsorbed dropped to 15%. The total capacity of the polymer for adsorption of $SO_2$ was found to be 2g. per 100 grams of polymer.

This resin when coated from solution onto two supports, viz., polyurethane foam (45 pores per inch) and filter paper showed capacities of 2–3 g. of $SO_2$/100 g. of resin in each case.

EXAMPLE 2

Preparation of Crosslinked Polyvinylbenzyl Diethanolamine Resin and Evaluation as Adsorbent for $SO_2$ One gram of the classical Merrifield peptide resin (R. D. Merrifield, Science, 150 178, 1965), a chloromethylated polystyrene crosslinked with 2% divinylbenzene containing 0.95 milliequivalents/gram of chloromethyl functionality was treated with 20 g. of diethanolamine at 150°C. over a period of 16 hours. After cooling, the mixture was added to methanol, filtered, washed with methanol and dried in vacuo at 40°C. for 4 hours. The infrared spectrum of this product showed strong amine and hydroxyl absorption bands. The yield was 0.85 grams of crosslinked polyvinylbenzyl diethanolamine resin.

A small glass column was packed with 0.5989 grams of the crosslinked polyvinylbenzyl diethanolamine resin prepared above. Sulfur dioxide was passed at room temperature through the column at a rate of 150 ml./min. until a constant weight was obtained which required 2 hours. The total weight gain was 0.1115 grams or 18.7 grams of $SO_2$ adsorbed per 100 grams of resin.

Regeneration of this resin was demonstrated by heating the above resin completely saturated with $SO_2$ in vacuo at 90°C. until a constant weight was obtained. The original total weight of tube, resin and adsorbed $SO_2$ was 0.7104 grams. The final weight after heating at 90°C. was 0.6073 grams. This represented a 92.5% regeneration of the resin sample.

A Control A was run on 0.7129 grams of crosslinked polyvinylbenzyl chloride (classical Merrifield peptide resin) prior to treatment with diethanolamine. This was placed in a small glass column and sulfur dioxide was passed at room temperature through the column until a constant weight of 0.7684 grams was obtained. This represents that there is a purely physical adsorption or absorption of 7.7 grams of sulfur dioxide per 100 grams of this resin without the presence of a nitrogen containing group.

EXAMPLE 3

Resin Derived from Polyvinylchloride and Diethanolamine

A 25 gram sample of a vinyl chloride/ethylene copolymer containing 1.2% ethylene (inherent viscosity of 0.76–0.80 when measured as a 0.2% solution by weight in cyclohexanone at 25°C.) was heated at 125°C. with 110 grams of diethanolamine. After 18 hours reaction time the mixture was cooled to room temperature whereupon a dark solid precipitated from the excess diethanolamine. The solid was recovered by filtration, washed several times with chloroform and dried in vacuo at ambient temperature. Analysis of the 30.6 g. yield of product showed:

%C = 42.80; %H = 7.16; %N = 4.37 consistent with a polymer having the repeating unit:

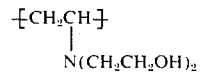

The product which decomposed at 240°C. was hydrated to contain 10% by weight of water. A 9 inches × ⅛ inch Teflon tube was filled with 1.7331 grams of this product. The tube was maintained at a temperature of 40°C. in an oven while a constant flow of a gas mixture containing 3,000 ppm of $SO_2$(15% $CO_2$)saturated with water was passed through the tube and the effluent monitored using Kitigawa $SO_2$ analysis tubes. After 25 minutes the $SO_2$ content of the effluent remained constant at 15 ppm. After 4 hours the $SO_2$ content of the effluent increased sharply to 1000 ppm and then to 3000 ppm. The gain in weight of the tube was 0.2186 grams indicating an absorption of 14% of $SO_2$ measured on a dry resin basis.

A Control B consisting of a glass column packed with 0.7236 grams of the same vinyl chloride copolymer prior to reaction with diethanolamine was exposed to a flow of pure $SO_2$ for a period of 16 hours. It showed a 4.3% weight gain after this exposure.

EXAMPLE 4

Resin Derived from Polyvinyl Chloride and Dimethylamine

The synthesis procedure of Example 3 was repeated with the exception that dimethylamine was substituted for the diethanolamine. The linear, particulate resin having repeating units of the formula:

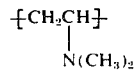

when exposed to a stream of pure $SO_2$ adsorbed 11.1 grams of $SO_2$ per 100 grams of resin.

EXAMPLE 5

Resin Derived from Polyvinyl Chloride and Monoethanolamine

The synthesis procedure of Example 3 was repeated with the exception that monoethanolamine was substituted for diethanolamine. The linear, particulate resin having repeating units of the formula:

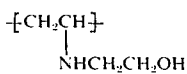

when exposed to a stream of pure $SO_2$, adsorbed 16.1 grams of $SO_2$ per 100 grams of resin.

Although the invention has been described in its preferred forms with a certain degree of particularity, it is understood that the present disclosure of the preferred forms has been only by way of example and that numerous changes may be resorted to without departing from the spirit and scope of the invention.

What is claimed is:

1. Method for removing $SO_2$ from gas mixtures containing moisture which comprises contacting said gas mixtures at a temperature of about 0° to 90°C. with a normally solid polymer having repeating groups represented by the formula:

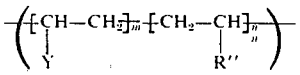

wherein Y is a monovalent radical selected from the group consisting of:

—N(R)$_2$
—NHR'OH
—N(R'OH)$_2$

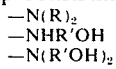

or

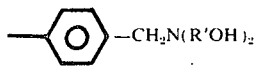

wherein R is alkyl containing 1 to 18 carbon atoms, R' is an alkylene group containing 1 to about 6 carbon atoms, R" is a monovalent radical selected from the group consisting of: hydrogen, lower alkyl groups having up to about 4 carbon atoms, halogen or phenyl, $m$ is an integer having a value of about 50 to about 500 and $n$ is an integer having a value of 0 to about 500.

2. Method claimed in claim 1 wherein $n$ is 0.
3. Method claimed in claim 1 wherein R" is hydrogen.
4. Method claimed in claim 1 wherein R" is phenyl.
5. Method claimed in claim 1 wherein Y is —N(R'OH)$_2$.
6. Method claimed in claim 1 wherein Y is —NHR'OH.
7. Method claimed in claim 1 wherein Y is

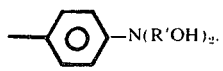

8. Method claimed in claim 1 wherein Y is

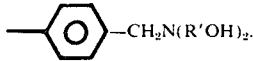

9. Method claimed in claim 1 wherein the polymer is a particulate resin.
10. Method claimed in claim 1 wherein the polymer is deposited on a support.
11. Method claimed in claim 10 wherein the support is a cellulosic substance.
12. Method claimed in claim 10 wherein the support is a polyurethane.
13. Method claimed in claim 10 wherein the support is silica.
14. Method claimed in claim 1 wherein the gas mixture is ambient air containing about 0.01–0.2 ppm of $SO_2$.
15. Method claimed in claim 1 wherein the normally solid polymer is crosslinked with a crosslinking agent.
16. Method claimed in claim 15 wherein the crosslinking agent is divinylbenzene.

* * * * *

PO-1050
(5/69)

UNITED STATES PATENT OFFICE
CERTIFICATE OF CORRECTION

Patent No. 3,917,469                    Dated  Nov. 4, 1975

Inventor(s)  Robert J. Cotter and Michael J. Keogh

It is certified that error appears in the above-identified patent and that said Letters Patent are hereby corrected as shown below:

The first formula in claim 1 should read as follows:

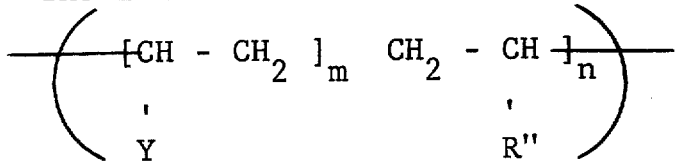

Signed and Sealed this fifteenth Day of June 1976

[SEAL]

Attest:

RUTH C. MASON
*Attesting Officer*

C. MARSHALL DANN
*Commissioner of Patents and Trademarks*